(12) United States Patent
Wong et al.

(10) Patent No.: US 7,849,259 B1
(45) Date of Patent: Dec. 7, 2010

(54) DISK CONTROLLER RESPONSE HANDLER FOR WRITE COMMANDS

(75) Inventors: William Wong, Cerritos, CA (US); Kha Nguyen, Anaheim, CA (US); Huy Tu Nguyen, Laguna Hills, CA (US); William Dennin, III, Mission Viejo, CA (US); Roger Baldwin, Mission Viejo, CA (US)

(73) Assignee: Marvell International Ltd., Hamilton (BM)

( * ) Notice: Subject to any disclaimer, the term of this patent is extended or adjusted under 35 U.S.C. 154(b) by 498 days.

(21) Appl. No.: 12/030,162

(22) Filed: Feb. 12, 2008

Related U.S. Application Data

(60) Provisional application No. 60/889,819, filed on Feb. 14, 2007.

(51) Int. Cl.
  *G06F 12/00* (2006.01)
  *G06F 13/00* (2006.01)
  *G06F 13/28* (2006.01)
  *G06F 3/00* (2006.01)
  *G06F 5/00* (2006.01)

(52) U.S. Cl. .............. 711/112; 711/119; 711/154; 710/53; 710/54

(58) Field of Classification Search .............. 711/112, 711/119, 154; 710/53–54
See application file for complete search history.

(56) References Cited

U.S. PATENT DOCUMENTS

| 7,730,257 | B2 * | 6/2010 | Franklin | 711/114 |
| 2004/0230742 | A1 * | 11/2004 | Ikeuchi et al. | 711/112 |
| 2005/0066120 | A1 * | 3/2005 | Ohta et al. | 711/112 |
| 2008/0168233 | A1 * | 7/2008 | Luc et al. | 711/133 |

* cited by examiner

*Primary Examiner*—Kevin L Ellis
*Assistant Examiner*—Ryan Bertram

(57) ABSTRACT

An execution queue stores a write command from the host in response to issuance of the write command from the host, and is removed from the execution queue in response to a signal indicating that data designated by the write command has been written to the hard disk. A holding queue stores the write command removed from the execution queue. In response to the command being stored in the holding queue, a request is issued for an acknowledgment from the host. The write command is removed from the holding queue in response to the acknowledgment being received from the host. An outgoing queue stores the write command removed from the holding queue for deletion. The queues are controlled by queue management hardware, the request is issued by the queue management hardware, and the signal and acknowledgment are received by the queue management hardware.

14 Claims, 7 Drawing Sheets

DISK CONTROLLER RESPONSE HANDLER FOR WRITE COMMANDS

CROSS-REFERENCE TO RELATED APPLICATION

This application claims the benefit of U.S. Provisional Patent Application No. 60/889,819, filed Feb. 14, 2007, the contents of which are hereby incorporated by reference as if fully stated herein.

TECHNICAL FIELD

The present invention relates generally to data processing, and more specifically to processing write commands from a host to a hard disk.

BACKGROUND

Storing and retrieving data on a hard disk or other storage media are essential to modern computing. As such, it is important to be able to quickly and accurately write data to the hard disk. A conventional process for writing data to a hard disk relies on system firmware to wait for various signals and interrupts. For example, the system firmware may be required to wait for an interrupt indicating that data has been successfully written to the hard disk, and another interrupt that the host has acknowledged the successful writing of the data. This can lead to increased processing time and correspondingly lowered throughput, especially in the case of relatively slow disk-writing hardware. Moreover, since system firmware is responsible for processing many other commands besides write commands, the lag time in processing write commands generally leads to reduced overall processing speed.

SUMMARY

The present invention addresses the foregoing by providing a disk controller with a response handler for write commands.

Thus, in one aspect, a representative embodiment of the invention provides for writing data from a host to hard disk. An execution queue stores a write command from the host in response to issuance of the write command from the host. The write command is removed from the execution queue in response to a signal indicating that data designated by the write command has been written to the hard disk. A holding queue stores the write command removed from the execution queue in response to the signal indicating that the data designated by the write command has been written to the hard disk. In response to the write command being stored in the holding queue, a request is issued for an acknowledgment from the host. In one aspect, the issued request is a request to send GOOD RESPONSE to the host, and an acknowledgment from the host is waited for. The write command is removed from the holding queue in response to the acknowledgment being received from the host. An outgoing queue stores the write command removed from the holding queue in response to the acknowledgment being received from the host. The outgoing queue stores the write command for deletion. Each of the execution queue, the holding queue, and the outgoing queue are controlled by queue management hardware, the request is issued by the queue management hardware, and the signal and the acknowledgment are received by the queue management hardware. In one aspect, the request to send GOOD RESPONSE to the host is issued by the queue management hardware.

Since write commands are processed based on the signals received by queue management hardware, system firmware is ordinarily relieved from significant processing related to the write commands, such as waiting for interrupts. Thus, the firmware can process other commands, leading to increased command throughput and performance.

In another aspect, a representative embodiment of the invention provides for writing data from a host to a hard disk. First means store a write command from the host in response to issuance of the write command from the host. The write command is removed from the first means in response to a signal indicating that data designated by the write command has been written to the hard disk. Second means store the write command removed from the first means in response to the signal indicating that the data designated by the write command has been written to the hard disk. In response to the write command being stored in the second means, a request is issued for an acknowledgment from the host. In one aspect, the issued request is a request to send GOOD RESPONSE to the host, and an acknowledgment from the host is waited for. The write command is removed from the second means in response to the acknowledgment being received from the host. Third means store the write command removed from the holding queue in response to the acknowledgment being received from the host. The third means store the write command for deletion. Each of the first, second, and third means are controlled by hardware, the request is issued by the hardware, and the signal and the acknowledgment are received by the hardware. In one aspect, the request to send GOOD RESPONSE to the host is issued by the hardware.

In still another aspect, a representative embodiment of the invention provides a computer-executable program for writing data from a host to a hard disk. An execution queue is configured to store a write command from the host in response to issuance of the write command from the host. The write command is removed from the execution queue in response to a signal indicating that data designated by the write command has been written to the hard disk. A holding queue is configured to store the write command removed from the execution queue in response to the signal indicating that the data designated by the write command has been written to the hard disk. In response to the write command being stored in the holding queue, a request is issued for an acknowledgment from the host. In one aspect, the issued request is a request to send GOOD RESPONSE to the host, and an acknowledgment from the host is waited for. The write command is removed from the holding queue in response to the acknowledgment being received from the host. An outgoing queue is configured to store the write command removed from the holding queue in response to the acknowledgment being received from the host. The outgoing queue stores the write command for deletion. Each of the execution queue, the holding queue, and the outgoing queue are controlled by queue management hardware, the request is issued by the queue management hardware, and the signal and the acknowledgment are received by the queue management hardware. In one aspect, the request to send GOOD RESPONSE to the host is issued by the queue management hardware.

A more complete understanding of the invention can be obtained by reference to the following detailed description in connection with the attached drawings.

DETAILED DESCRIPTION

Figure 1:
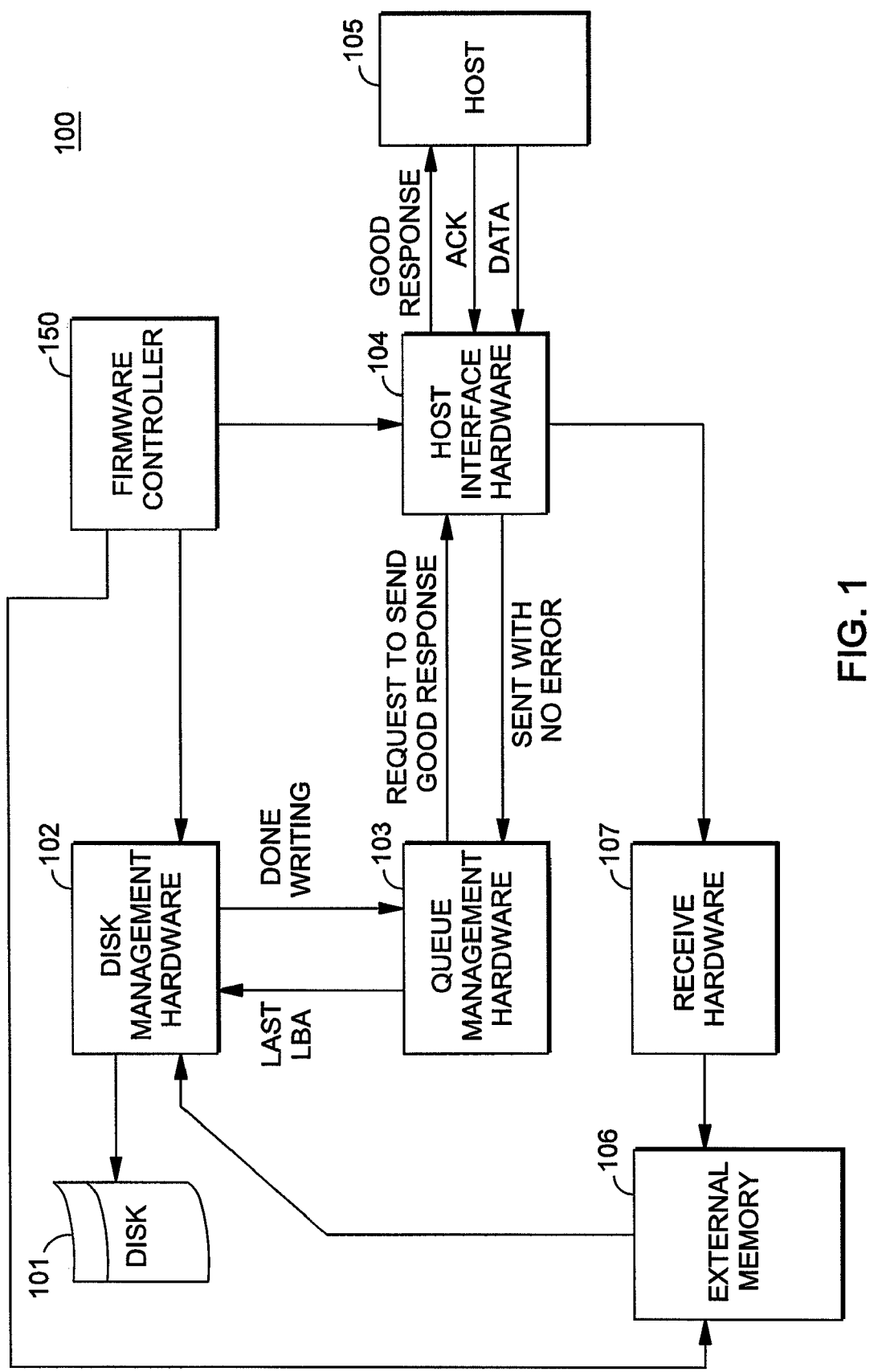
FIG. 1 is a block diagram of a data transfer system in which an example of the present invention may be practiced.

FIG. 1 is a block diagram of a data transfer system 100 in which an embodiment of the present invention may be practiced.

In one implementation, data transfer system 100 includes a hard disk 101, disk management hardware 102, queue management hardware 103, host interface hardware 104, host 105, external memory 106 and receive hardware 107.

In one implementation, hard disk 101 is a non-volatile storage device that stores digitally encoded data on magnetic surfaces. The physical embodiment of hard disk 101 may vary based on the application for which the hard disk 101 is manufactured. More specifically, while a common embodiment of host 105 is a computer, numerous other devices could function as the host. For example, host 105 could be a digital video recorder, digital audio player, personal digital assistant, digital camera, video game console, mobile phone, or any other device that can be configured to write to hard disk 101. Thus, hard disk 101 may vary based on the embodiment of host 105.

Data is ordinarily written and stored on hard disk 101 in units of blocks, with each block typically being a set number of bytes. Various disk interface protocols may be used to read and write the blocks to hard disk 101, including Fibre Channel ("FC") or Serial Attached Small Computer Interface ("SAS"). More generally, other conventional disk interface protocols may be used to read and write data to hard disk 101.

While a hard disk is depicted in FIG. 1 and described herein, the present invention may also be implemented with respect to storage media other than a hard disk. For example, the storage medium being accessed could be comprised of a CD/DVD drive, jump drive, floppy disk or magnetic tape, among others. All such media can be constructed to hold large amounts of data, and are generally prone to read and write errors and thus typically incorporate a series of acknowledgments to detect the occurrence of such errors, and ordinarily have a slower access speed than a faster local memory.

In one implementation, disk management hardware 102 writes data to hard disk 101 from external memory 106. For purposes of simplicity, disk management hardware 102 is shown in FIG. 1 as directly connected to external memory 106. However, this connection can be via a data bus, an indirect connection, or any other method of transmitting information between the two elements. In addition, disk management hardware 102 receives data indicating the last Logical Block Address ("LAST LBA") of the data to be written from external memory 106. Disk management hardware 102 also issues a signal to indicate that the data for a write command has been written to hard disk 101, shown in FIG. 1 as "DONE WRITING".

Queue management hardware 103 manages the movement of commands through the command queues of the present invention. In the embodiment shown in FIG. 1, the queues themselves are incorporated in queue management hardware 103, as shown in more detail in FIG. 2. Data transfer system 100 could also be constructed such that the command queues are implemented as a separate unit.

As shown in FIG. 1, queue management hardware 103 transmits the LAST LBA signal to disk management hardware 102. Queue management hardware 103 also receives the DONE WRITING signal from disk management hardware 102, indicating that disk management hardware 102 is done writing the data from the write command.

Queue management hardware 103 also communicates with host interface hardware 104. In particular, queue management hardware sends a request to host interface hardware 104 to send a "GOOD RESPONSE" signal, shown in FIG. 1 as "REQUEST TO SEND GOOD RESPONSE". Queue management hardware 103 also receives a "SENT WITH NO ERROR" (hereafter "NO ERROR") signal from host interface hardware 104, indicating acknowledgment from host 105 that the GOOD RESPONSE has been received without error.

Host interface hardware 104 acts as an intermediary between the data transfer system and host 105. Specifically, host interface hardware 104 is connected to receive hardware 107, in order to write commands and data into external memory 106 for temporary storage before writing the data to hard disk 101. Host interface hardware 104 also receives the REQUEST TO SEND GOOD RESPONSE signal from queue management hardware 103, and sends the GOOD RESPONSE signal to host 105. Additionally, host interface hardware 104 receives an ACK signal from host 105, and sends a NO ERROR signal to queue management hardware 103. Each of these processes will be described more specifically below with respect to FIG. 4.

Host 105 is the host device that sends commands to write data to hard disk 101. As noted above, while a common embodiment of host 105 is a computer, numerous other devices could function as the host.

External memory 106 stores commands and data from host 105 before the data is written to hard disk 101. More specifically, external memory 106 acts as a temporary memory for storing data before writing the data to hard disk 101, so that host 105 is not required to process the writing of data directly to hard disk 101 for every write command. Since writing to hard disk 101 can be relatively slow, a faster external memory also allows host 105 to more quickly store commands and data. Thus, in one embodiment, external memory 106 is constructed as a memory which can process data relatively quickly, at least compared to hard disk 101. For example, external memory 106 could be constructed as a double-data-rate synchronous dynamic random access memory (DDR SDRAM, hereafter "DDR"). Other embodiments of an external memory are possible, including RAM, flash card, a CD/DVD drive, jump drive, floppy disk, flash memory, optical storage or optical jukebox storage, holographic storage, phase-change memory, and off-site network storage, among others.

Receive hardware 107 is a hardware block that receives write commands and data from host 105 via host interface hardware 104, and writes the commands and data into external memory 106.

Firmware controller 150 is a hardware or software logic block responsible for operating the firmware of the data transfer system. In general, firmware comprises a computer program responsible for programmable content of a hardware device. Thus, the operations performed by firmware and firmware controller 150 can vary widely depending on the application and environment, including system boot functions, graphics displays, control menus, I/O, disk read/write, error handling, and conversion of data formats and data protocols, among many others.

Figure 2:
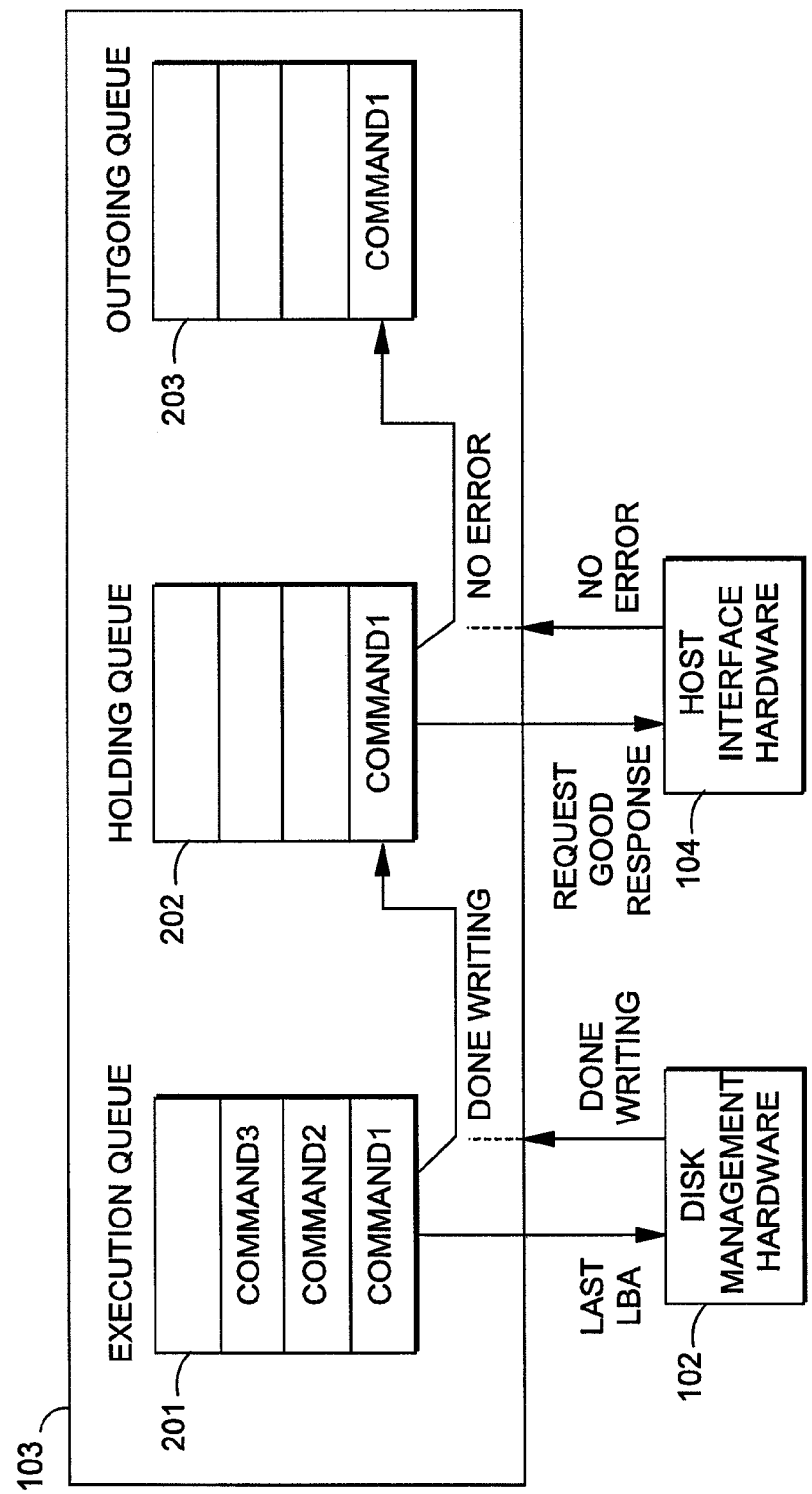
FIG. 2 is a block diagram illustrating command queues of the data transfer system of FIG. 1.

Turning to FIG. 2, the command queues (command queue system 200) in accordance with one implementation of the present invention will now be described. In this implementation, a command is removed from one queue and moved to a next queue automatically based on signals received by queue management hardware 103 from disk management hardware 102 and host 105, and these signals trigger the necessary processing. Thus, to the extent that there is a need to wait for signals and interrupts, such waiting is performed by queue management hardware 103, rather than system firmware. This allows firmware controller 150 and system firmware to process other commands such as system boot operations, arithmetic operations, managing values of registers, read commands, and input/output operations.

As shown in FIG. 2, command queue system 200 includes an execution queue 201, holding queue 202, and outgoing queue 203. In one implementation, each queue is implemented in hardware with queue management hardware 103.

Execution queue 201 is programmed with write commands from host 105. In more detail, system firmware reads the write commands stored in external memory 106, and loads each command into execution queue 201 for execution. In one implementation, this is normally the only processing that system firmware is required to provide in terms of managing the queues.

Queue management hardware 103 extracts the last logical block address ("LAST LBA") from each command in execution queue 201, and sends the LAST LBA to disk management hardware 102, as shown in FIG. 1. LAST LBA will be described more specifically below with respect to FIG. 3. Using the LAST LBA, disk management hardware 102 is made aware of the last block of data in external memory 106.

Queue management hardware 103 then waits to receive an indication from disk management hardware 102 that the last of the requested data has been written to hard disk 101. This signal is depicted in FIGS. 1 and 2 as "DONE WRITING". Upon receiving the DONE WRITING signal, queue management hardware 103 moves the command to holding queue 202, as shown in FIG. 2.

Holding queue 202 serves as a temporary storage for executed commands while the command initiates a REQUEST TO SEND GOOD RESPONSE to host interface hardware 104, for host interface hardware 104 to send a GOOD RESPONSE signal to host 105.

In particular, once holding queue 202 receives the command from execution queue 201, queue management hardware 103 automatically issues the REQUEST TO SEND GOOD RESPONSE signal to host interface hardware 104, as shown in FIG. 2. In response to the request, host interface hardware 104 sends a GOOD RESPONSE signal to host 105 indicating successful writing of the data, which responds with an ACK signal to host interface hardware 104. Upon receiving the ACK signal, host interface hardware 104 issues a NO ERROR signal to queue management hardware 103.

Upon receipt of the NO ERROR signal, queue management hardware 103 automatically moves the command to outgoing queue 203, which stores write commands for deletion. The write command can then be deleted automatically from outgoing queue 203, without requiring system firmware to examine and delete each command.

In addition, automatic deletion of commands relieves system firmware of the responsibility to manage deletion of the OX_ID for each command. In more detail, an OX_ID is a unique identifier for each write command. Ordinarily, to initiate an I/O operation in a disk management environment, a host will initiate an exchange with a target device by sending a command including an originator exchange ID ("OX_ID"). If the OX_ID is currently in use, the host device cannot re-use the same OX_ID until the exchange is completed. Checking the OX_ID for every command ordinarily requires system firmware to arbitrate for access to external memory, and to search the table sequentially. Moreover, when a command is completed, the firmware must arbitrate for access to external memory to delete the OX_ID entry from the table.

However, in this embodiment of the present invention, the command and associated OX_ID are automatically deleted using outgoing queue 203. Therefore, system firmware and firmware controller 150 ordinarily do not need to be involved in this process.

Figure 3:
FIG. 3 is a block diagram illustrating the format of a write command in accordance with one implementation.

FIG. 3 is a block diagram showing the format of a write command. As can be seen, each command includes an OX_ID 301 and a section 302 entitled LAST LBA+1. The LAST LBA+1 section is used to send the LAST LBA signal to disk management hardware 102, as described above with respect to FIG. 1.

Specifically, the LAST LBA+1 section 302 indicates the address of the last logical block to be written from external memory 106 to hard disk 101. For example, if host 105 has requested to write 50 blocks to hard disk 101, and the blocks start at logical address "0005" in external memory 106, LAST LBA+1 would equal "0056". The "+1" is simply to account for the fact that hardware automatically increments incoming addresses by one logical space, and for purposes of simplicity, LAST LBA+1 is simply abbreviated as LAST LBA in FIG. 1. The LAST LBA information 302 is automatically extracted from a command in execution queue 201 by queue management hardware 103, and is sent to disk management hardware 102. Disk management 102 then can use the LAST LBA 302 to more quickly identify the logical addresses in external memory 106 from which to write data. For example, the LAST LBA can act as a logical "end point" for the disk management hardware, in that once disk management hardware finishes writing the block of data which contains the LAST LBA, it can inform the queue management hardware that it has completed writing all of the data for the current command to the disk.

The overall process of handling write commands using command queues will now be described with respect to FIG. 4.

Figure 4:
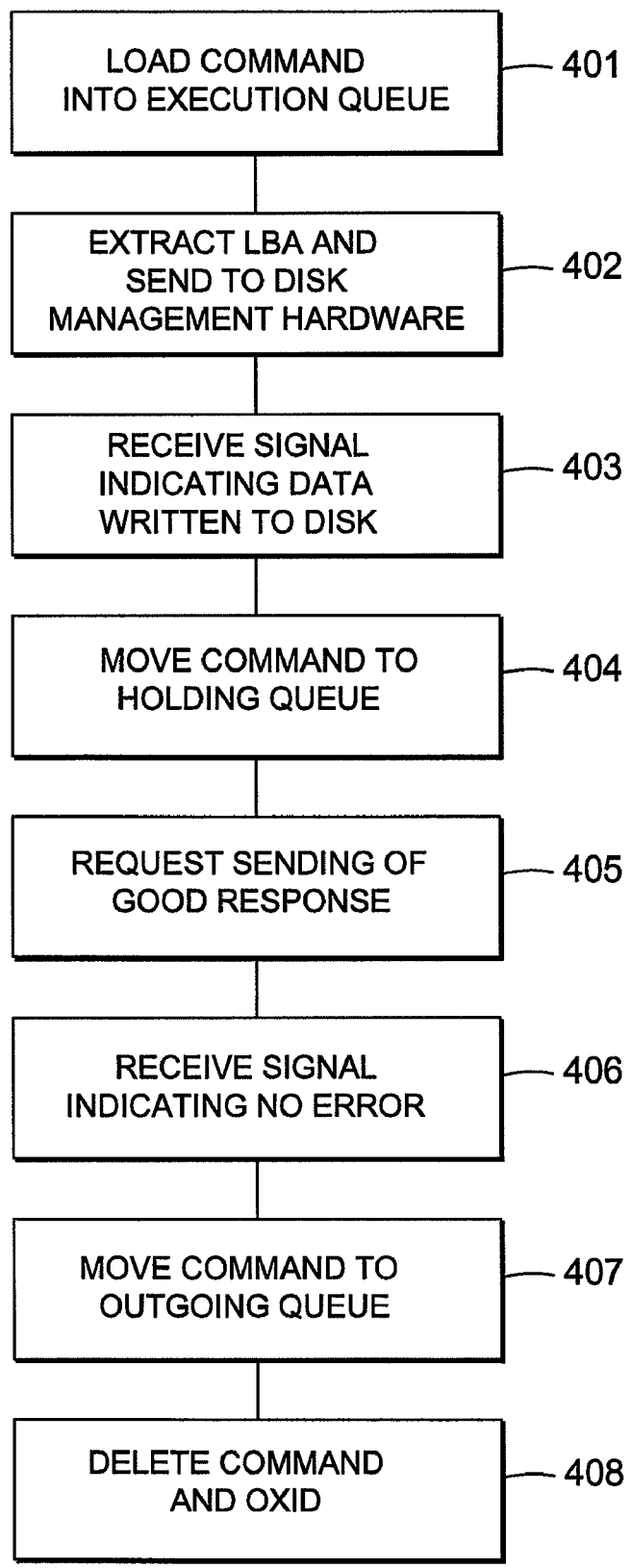
FIG. 4 is flowchart illustrating a process of handling write commands in accordance with one implementation.

As shown in FIG. 4, the process begins when a command is loaded into execution queue 201. As mentioned above, write commands and data from host 105 are initially stored in external memory 106. Thus, system firmware loads the command from external memory 106, and programs the command into execution queue 201. In this embodiment, this is the only step in which system firmware and firmware controller 150 are involved.

In step 402, queue management hardware 103 extracts the LBA from the command stored in execution queue 201, and sends it to disk management hardware 102. Disk management hardware 102 thus has the logical address of the last block of data from external memory 106 that it needs to write to hard disk 101, and does not need to rely on system firmware to examine the command and provide addresses. Disk management hardware 102 then proceeds to write the data. Queue management hardware 103 then waits for an indication from disk management hardware 102 that the data has been written to hard disk 101.

In step 403, queue management hardware 103 receives the signal that the data has been written to the hard disk, depicted in FIG. 1 as DONE WRITING.

In step 404, immediately upon receiving the DONE WRITING signal, queue management hardware 103 moves the command from execution queue 201 to holding queue 202.

In step 405, upon loading a command into holding queue 202, queue management hardware 103 automatically issues REQUEST TO SEND GOOD RESPONSE to host interface hardware 104, and waits for the NO ERROR signal from host interface hardware 104 indicating that host 105 has acknowledged successful execution of the write command.

In the meantime, a series of signals are used to receive an acknowledgment from host 105 that a write command has processed successfully. First, the REQUEST TO SEND GOOD RESPONSE signal from queue management hardware 103 requests host interface hardware 104 to send the GOOD RESPONSE signal. The GOOD RESPONSE signal, in turn, is an indication to host 105 that a command has processed successfully, as well as a request for host 105 to acknowledge the successful reception of the GOOD RESPONSE with an ACK signal. Once an ACK signal is received by host interface hardware 104 from host 105, host interface hardware can then send a NO ERROR signal to queue management hardware 103, indicating acknowledgment from host 105 of successful reception of the GOOD RESPONSE without error. In one implementation, if the host interface hardware does not receive the ACK signal after a predetermined period of time, system firmware determines that an error has occurred, and can intervene to identify the error and take appropriate measures such as resending the data or restarting the transfer process.

In step 406, queue management hardware 103 receives the NO ERROR signal from host interface hardware 104. Since the NO ERROR signal indicates acknowledgment from host 105 of successful execution of the write command, the command can be deleted.

Thus, upon receiving the NO ERROR signal from host interface hardware 104 in step 406, queue management hardware 103 immediately moves the command to outgoing queue 203 in step 407, and outgoing queue 203 temporarily stores the command until the command and corresponding OX_ID are deleted in step 408.

Therefore, by virtue of the above arrangement, processing of write commands is based on the signals received by the queue hardware, and the firmware only needs to initially program the command in the execution queue. Thus, the firmware can process other commands, therefore leading to increased command throughput and often to increased overall performance.

Figure 5A:
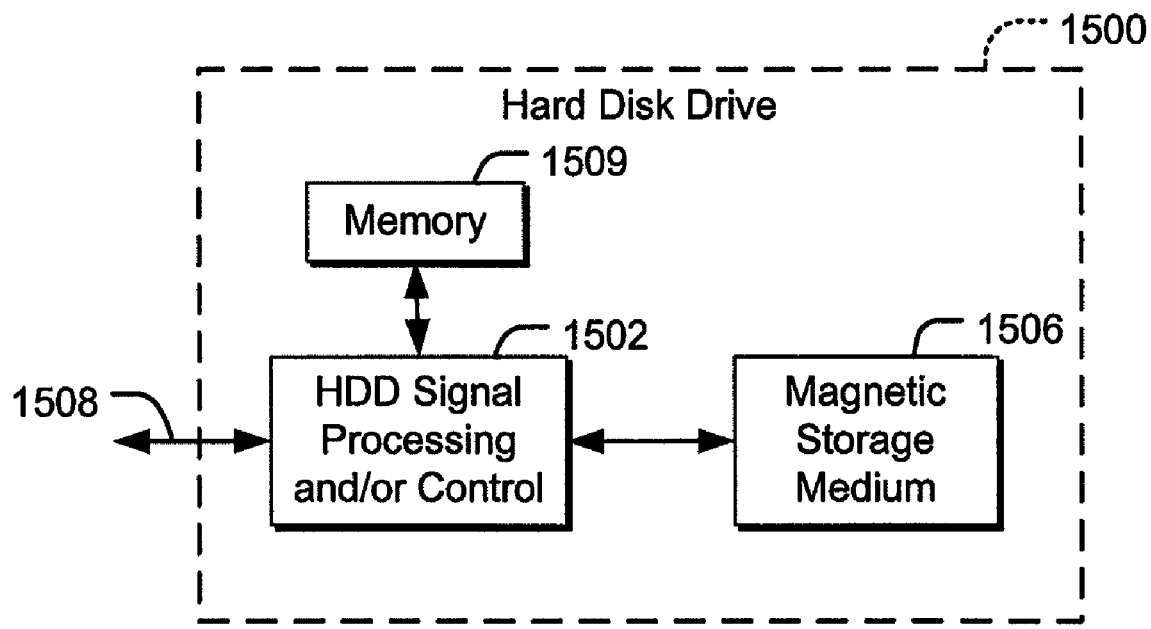
FIG. 5A is a block diagram showing an embodiment of the invention in a hard disk drive (HDD).

Referring now to FIGS. 5A-5H, various exemplary implementations of the present invention are shown. Referring to FIG. 5A, the present invention may be embodied for controlling data transfer in a hard disk drive (HDD) 1500. The present invention may implement either or both signal processing and/or control circuits, which are generally identified in FIG. 5A at 1502. In some implementations, signal processing and/or control circuit 1502 and/or other circuits (not shown) in HDD 1500 may process data, perform coding and/or encryption, perform calculations, and/or format data that is output to and/or received from a magnetic storage medium 1506.

HDD 1500 may communicate with a host device (not shown) such as a computer, mobile computing devices such as personal digital assistants, cellular phones, media or MP3 players and the like, and/or other devices via one or more wired or wireless communication links 1508. HDD 1500 may be connected to memory 1509, such as random access memory (RAM), a low latency nonvolatile memory such as flash memory, read only memory (ROM) and/or other suitable electronic data storage.

Figure 5B:
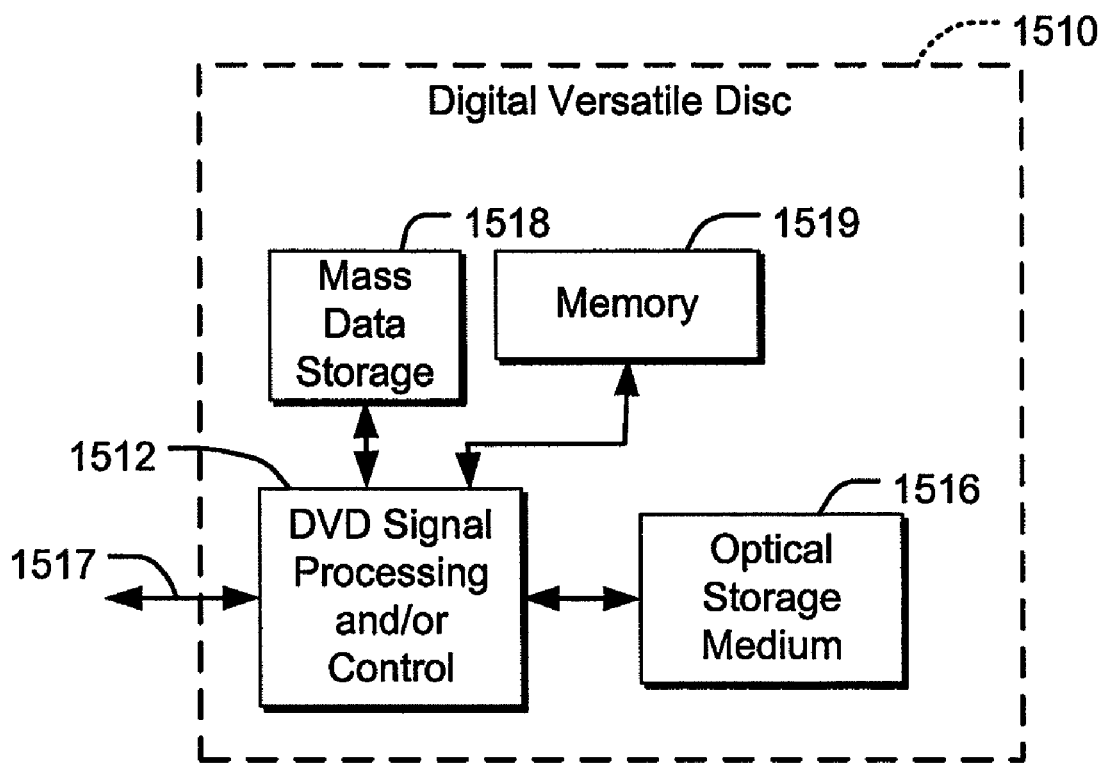
FIG. 5B is a block diagram of an embodiment of the invention in a digital versatile disc (DVD) drive.

Referring now to FIG. 5B, the present invention may be embodied for controlling data transfer in a digital versatile disc (DVD) drive 1510. The present invention may implement either or both signal processing and/or control circuits, which are generally identified in FIG. 5B at 1512, and/or mass data storage 1518 of DVD drive 1510. Signal processing and/or control circuit 1512 and/or other circuits (not shown) in DVD drive 1510 may process data, perform coding and/or encryption, perform calculations, and/or format data that is read from and/or data written to an optical storage medium 1516. In some implementations, signal processing and/or control circuit 1512 and/or other circuits (not shown) in DVD drive 1510 can also perform other functions such as encoding and/or decoding and/or any other signal processing functions associated with a DVD drive.

DVD drive 1510 may communicate with an output device (not shown) such as a computer, television or other device via one or more wired or wireless communication links 1517. DVD drive 1510 may communicate with mass data storage 1518 that stores data in a nonvolatile manner. Mass data storage 1518 may include a hard disk drive (HDD) such as that shown in FIG. 5A. The HDD may be a mini HDD that includes one or more platters having a diameter that is smaller than approximately 1.8". DVD drive 1510 may be connected to memory 1519, such as RAM, ROM, low latency nonvolatile memory such as flash memory, and/or other suitable electronic data storage.

Figure 5C:
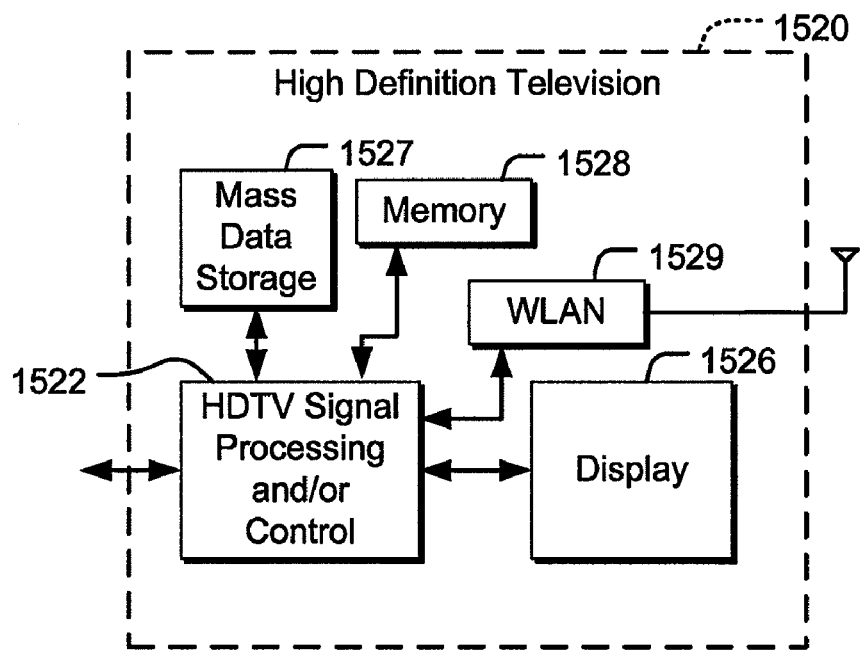
FIG. 5C is a block diagram of an embodiment of the invention in a high definition television (HDTV).

Referring now to FIG. 5C, the present invention may be embodied for controlling data transfer in a high definition television (HDTV) 1520. The present invention may implement either or both signal processing and/or control circuits, which are generally identified in FIG. 5C at 1522, a WLAN network interface 1529 and/or mass data storage of the HDTV 1520. HDTV 1520 receives HDTV input signals in either a wired or wireless format and generates HDTV output signals for a display 1526. In some implementations, signal processing circuit and/or control circuit 1522 and/or other circuits (not shown) of HDTV 1520 may process data, perform coding and/or encryption, perform calculations, format data and/or perform any other type of HDTV processing that may be required.

HDTV 1520 may communicate with mass data storage 1527 that stores data in a nonvolatile manner such as optical and/or magnetic storage devices. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". HDTV 1520 may be connected to memory 1528 such as RAM, ROM, low latency nonvolatile memory such as flash memory and/or other suitable electronic data storage. HDTV 1520 also may support connections with a WLAN via WLAN network interface 1529.

Figure 5D:
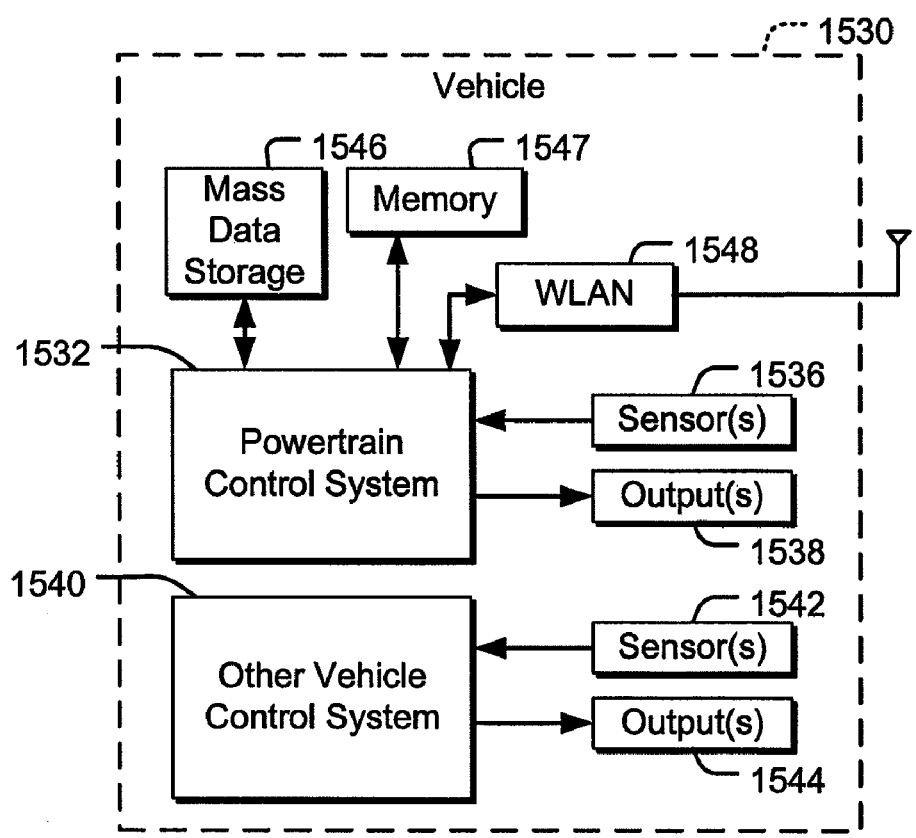
FIG. 5D is a block diagram of an embodiment of the invention in a vehicle.

Referring now to FIG. 5D, the present invention may be embodied for controlling data transfer in a control system of a vehicle 1530, a WLAN network interface 1548 and/or mass data storage of the vehicle 1530. In some implementations, the present invention implements a powertrain control system 1532 that receives inputs from one or more sensors 1536 such as temperature sensors, pressure sensors, rotational sensors, airflow sensors and/or any other suitable sensors and/or that generates one or more output control signals 1538 such as engine operating parameters, transmission operating parameters, braking parameters and/or other control signals.

The present invention may also be embodied in other control systems 1540 of vehicle 1530. Control system 1540 may likewise receive signals from input sensors 1542 and/or output control signals to one or more output devices 1544. In some implementations, control system 1540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 1532 may communicate with mass data storage 1546 that stores data in a nonvolatile manner. Mass data storage 1546 may include optical and/or magnetic storage devices for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Powertrain control system 1532 may be connected to memory 1547 such as RAM, ROM, low latency nonvolatile memory such as flash memory and/or other suitable electronic data storage. Powertrain control system 1532 also may support connections with a WLAN via WLAN network interface 1548. The control system 1540 may also include mass data storage, memory and/or a WLAN interface (all not shown).

Figure 5E:
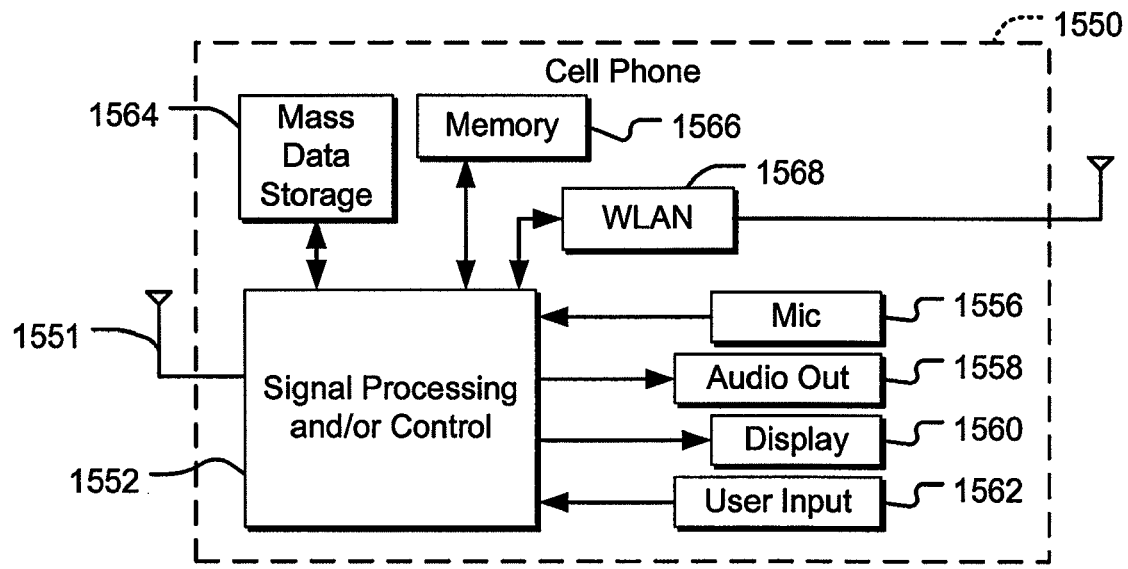
FIG. 5E is a block diagram of an embodiment of the invention in a cellular or mobile phone.

Referring now to FIG. 5E, the present invention may be embodied for controlling data transfer in a cellular phone 1550 that may include a cellular antenna 1551. The present invention may implement either or both signal processing and/or control circuits, which are generally identified in FIG. 5E at 1552, a WLAN network interface 1568 and/or mass data storage 1564 of the cellular phone 1550. In some implementations, cellular phone 1550 includes a microphone 1556, an audio output 1558 such as a speaker and/or audio output jack, a display 1560 and/or an input device 1562 such as a keypad, pointing device, voice actuation and/or other input device. Signal processing and/or control circuits 1552 and/or other circuits (not shown) in cellular phone 1550 may process data, perform coding and/or encryption, perform calculations, format data and/or perform other cellular phone functions.

Cellular phone 1550 may communicate with mass data storage 1564 that stores data in a nonvolatile manner such as optical and/or magnetic storage devices for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Cellular phone 1550 may be connected to memory 1566 such as RAM, ROM, low latency nonvolatile memory such as flash memory and/or other suitable electronic data storage. Cellular phone 1550 also may support connections with a WLAN via WLAN network interface 1568.

Figure 5F:
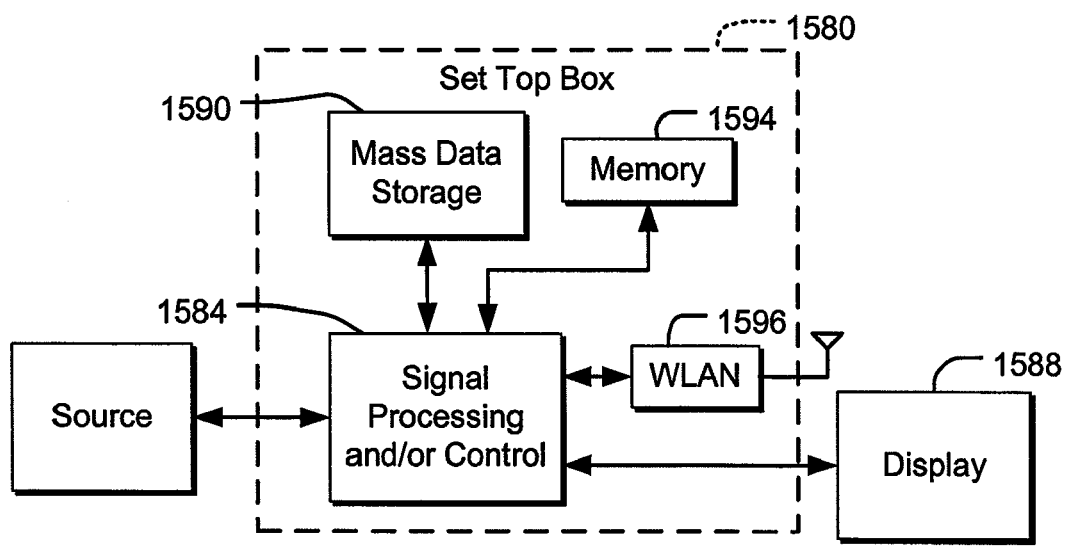
FIG. 5F is a block diagram of an embodiment of the invention in a set-top box (STB).

Referring now to FIG. 5F, the present invention may be embodied for controlling data transfer in a set top box 1580. The present invention may implement either or both signal processing and/or control circuits, which are generally identified in FIG. 5F at 1584, a WLAN network interface 1596 and/or mass data storage 1590 of the set top box 1580. Set top box 1580 receives signals from a source such as a broadband source and outputs standard and/or high definition audio/video signals suitable for a display 1588 such as a television and/or monitor and/or other video and/or audio output devices. Signal processing and/or control circuits 1584 and/or other circuits (not shown) of the set top box 1580 may process data, perform coding and/or encryption, perform calculations, format data and/or perform any other set top box function.

Set top box 1580 may communicate with mass data storage 1590 that stores data in a nonvolatile manner. Mass data storage 1590 may include optical and/or magnetic storage devices for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Set top box 1580 may be connected to memory 1594 such as RAM, ROM, low latency nonvolatile memory such as flash memory and/or other suitable electronic data storage. Set top box 1580 also may support connections with a WLAN via WLAN network interface 1596.

Figure 5G:
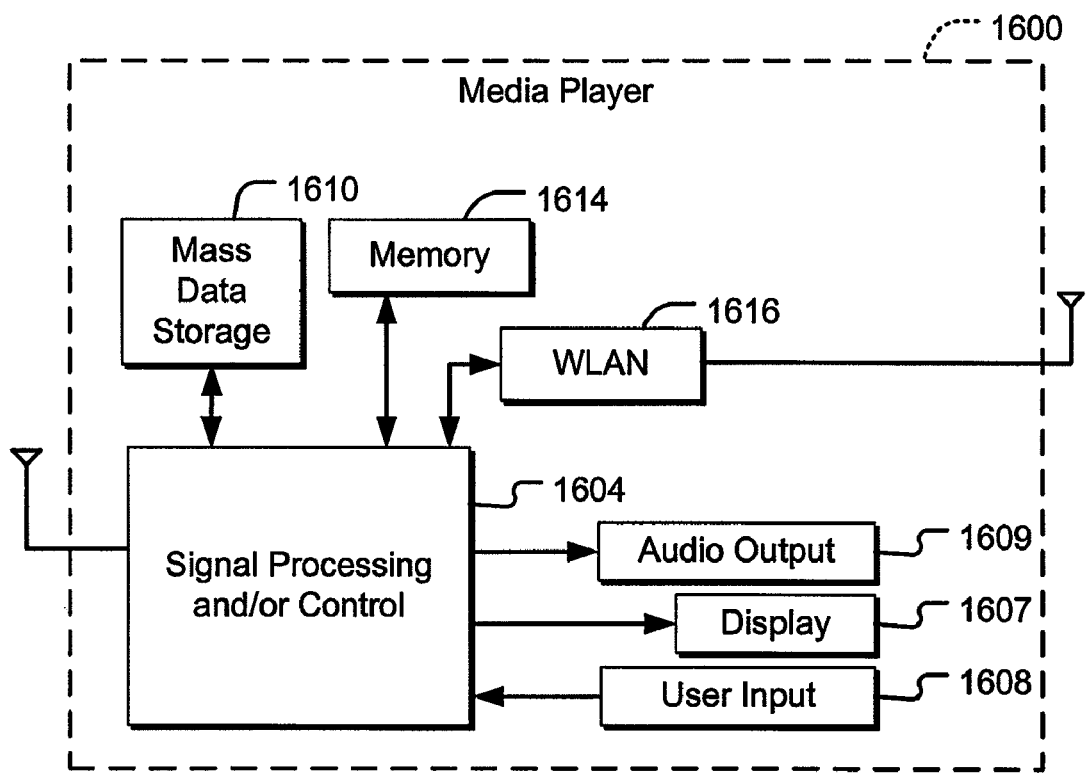
FIG. 5G is a block diagram of an embodiment of the invention in a media player.

Referring now to FIG. 5G, the present invention may be embodied for controlling data transfer in a media player 1600. The present invention may implement either or both signal processing and/or control circuits, which are generally identified in FIG. 5G at 1604, a WLAN network interface 1616 and/or mass data storage 1610 of the media player 1600. In some implementations, media player 1600 includes a display 1607 and/or a user input 1608 such as a keypad, touchpad and the like. In some implementations, media player 1600 may employ a graphical user interface (GUI) that typically employs menus, drop down menus, icons and/or a point-and-click interface via display 1607 and/or user input 1608. Media player 1600 further includes an audio output 1609 such as a speaker and/or audio output jack. Signal processing and/or control circuits 1604 and/or other circuits (not shown) of media player 1600 may process data, perform coding and/or encryption, perform calculations, format data and/or perform any other media player function.

Media player 1600 may communicate with mass data storage 1610 that stores data such as compressed audio and/or video content in a nonvolatile manner. In some implementations, the compressed audio files include files that are compliant with MP3 format or other suitable compressed audio and/or video formats. The mass data storage 1610 may include optical and/or magnetic storage devices for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". Media player 1600 may be connected to memory 1614 such as RAM, ROM, low latency nonvolatile memory such as flash memory and/or other suitable electronic data storage. Media player 1600 also may support connections with a WLAN via WLAN network interface 1616. Still other implementations in addition to those described above are contemplated.

Figure 5H:
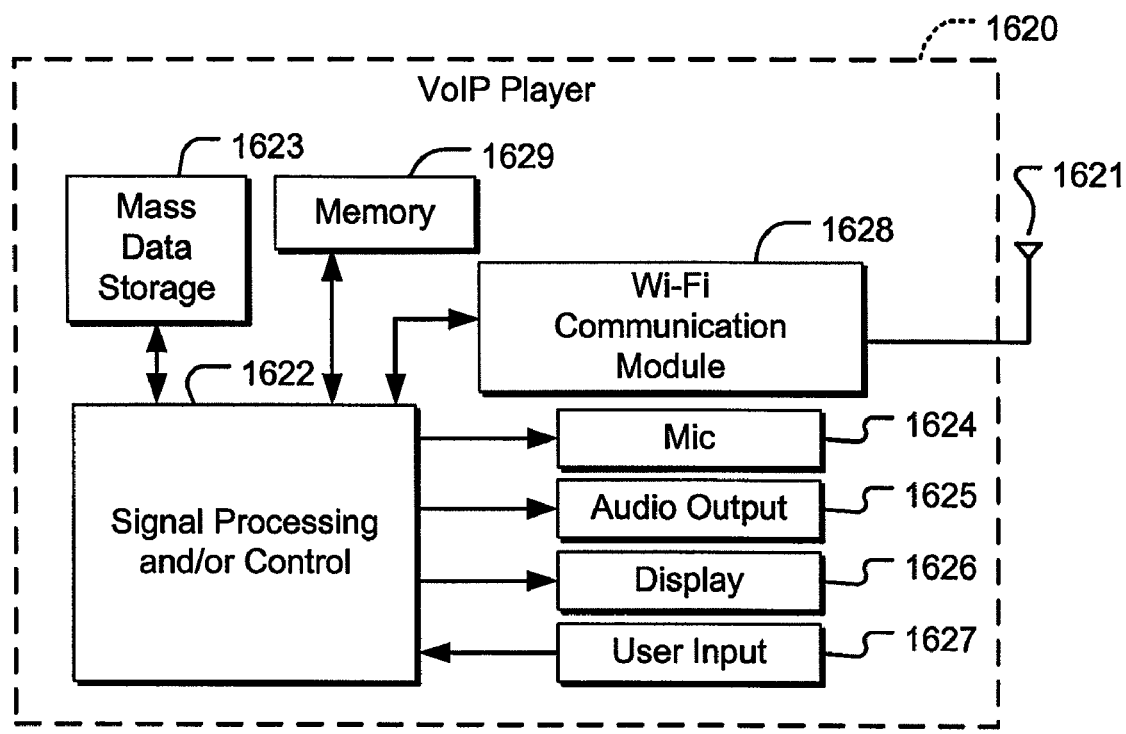
FIG. 5H is a block diagram of an embodiment of the invention in a Voice-over Internet Protocol (VoIP) player.

Referring to FIG. 5H, the present invention may be embodied for controlling data transfer in a Voice over Internet Protocol (VoIP) player 1620 that may include an antenna 1621. The present invention may implement either or both signal processing and/or control circuits, which are generally identified in FIG. 5B at 1622, a wireless interface and/or mass data storage 1623 of the VoIP player 1620. In some implementations, VoIP player 1620 includes, in part, a microphone 1624, an audio output 1625 such as a speaker and/or audio output jack, a display monitor 1626, an input device 1627 such as a keypad, pointing device, voice actuation and/or other input devices, and a Wireless Fidelity (Wi-Fi) communication module 1628. Signal processing and/or control circuits 1622 and/or other circuits (not shown) in VoIP player 1620 may process data, perform coding and/or encryption, perform calculations, format data and/or perform other VoIP player functions.

VoIP player 1620 may communicate with mass data storage 1623 that stores data in a nonvolatile manner such as optical and/or magnetic storage devices, for example hard disk drives and/or DVD drives. At least one HDD may have the configuration shown in FIG. 5A and/or at least one DVD drive may have the configuration shown in FIG. 5B. The HDD may be a mini HDD that includes one or more platters having a diameter that is smaller than approximately 1.8". VoIP player 1620 may be connected to memory 1629, which may be a RAM, ROM, low latency nonvolatile memory such as flash memory and/or other suitable electronic data storage. VoIP player 1620 is configured to establish communications link with a VoIP network (not shown) via Wi-Fi communication module 1628.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. An apparatus for writing data from a host to a hard disk, the apparatus comprising:
   an execution queue to store a write command from the host in response to issuance of the write command from the host, wherein the write command is removed from the execution queue in response to a signal indicating that data designated by the write command has been written to the hard disk;
   a holding queue to store the write command removed from the execution queue in response to the signal indicating that the data designated by the write command has been written to the hard disk, wherein in response to the write command being stored in the holding queue, a request is issued for an acknowledgment from the host, and wherein the write command is removed from the holding queue in response to the acknowledgment being received from the host;
   an outgoing queue to store the write command removed from the holding queue in response to the acknowledgment being received from the host, wherein the outgoing queue stores the write command for deletion;
   wherein each of the execution queue, the holding queue, and the outgoing queue are controlled by queue management hardware, wherein the request is issued by the queue management hardware, and wherein the signal and the acknowledgment are received by the queue management hardware.

2. The apparatus according to claim 1, wherein a last block address indicating a last block of data to be written is extracted from the write command in the execution queue.

3. The apparatus according to claim 2, wherein disk management hardware writes the last data to the hard disk based on the last block address.

4. The apparatus according to claim 2, wherein the last block address is a logical address.

5. The apparatus according to claim 1, wherein data to be written to the hard disk is first written to an external DDR memory.

6. The apparatus according to claim 1, wherein system firmware processes other commands while the queue management hardware processes the write command.

7. The apparatus according to claim 6, wherein system firmware communicates with host interface hardware, the disk management hardware, and the external memory to process application requests while the queue management hardware processes the write command.

8. A method for writing data from a host to hard disk, the method comprising:
   configuring an execution queue to store a write command from the host in response to issuance of the write command from the host, wherein the write command is removed from the execution queue in response to a signal indicating that data designated by the write command has been written to the hard disk;
   configuring a holding queue to store the write command removed from the execution queue in response to the signal indicating that the data designated by the write command has been written to the hard disk, wherein in response to the command being stored in the holding queue, a request is issued for an acknowledgment from the host, and wherein the write command is removed from the holding queue in response to the acknowledgment being received from the host;
   configuring an outgoing queue to store the write command removed from the holding queue in response to the acknowledgment being received from the host, wherein the outgoing queue stores the write command for deletion; and
   controlling each of the execution queue, the holding queue, and the outgoing queue using queue management hardware, wherein the request is issued by the queue management hardware, and wherein the signal and the acknowledgment are received by the queue management hardware.

9. The method according to claim 8, wherein a last block address indicating a last block of data to be written is extracted from the write command in the execution queue.

10. The method according to claim 9, wherein disk management hardware writes the data to the hard disk based on the last block address.

11. The method according to claim 9, wherein the last block address is a logical address.

12. The method according to claim 8, wherein data to be written to the hard disk is first written to an external DDR memory.

13. The method according to claim 8, wherein system firmware processes other commands while the queue management hardware processes the write command.

14. The method according to claim 13, wherein system firmware communicates with host interface hardware, the disk management hardware and the external memory to process application requests while the queue management hardware processes the write command.

* * * * *